(12) United States Patent
Koum et al.

(10) Patent No.: US 10,736,078 B1
(45) Date of Patent: *Aug. 4, 2020

(54) DYNAMIC MUTING OF COMMUNICATION NOTIFICATIONS

(71) Applicant: WhatsApp Inc., Menlo Park, CA (US)

(72) Inventors: Jan Koum, Santa Clara, CA (US); Bryan D. O'Connor, Santa Clara, CA (US); Brian Acton, Santa Clara, CA (US)

(73) Assignee: WHATSAPP, INC., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/106,968

(22) Filed: Aug. 21, 2018

Related U.S. Application Data

(60) Continuation of application No. 15/269,442, filed on Sep. 19, 2016, now Pat. No. 10,098,090, which is a division of application No. 13/782,593, filed on Mar. 1, 2013, now Pat. No. 9,473,428.

(51) Int. Cl.
| | |
|---|---|
| *G06F 15/16* | (2006.01) |
| *H04W 68/02* | (2009.01) |
| *H04L 12/58* | (2006.01) |
| *H04M 3/02* | (2006.01) |

(52) U.S. Cl.
CPC .......... *H04W 68/02* (2013.01); *H04L 51/046* (2013.01); *H04L 51/24* (2013.01); *H04M 3/02* (2013.01)

(58) Field of Classification Search
CPC ...................................................... H04L 51/24
USPC .......................................... 709/204, 206, 220
See application file for complete search history.

(56) References Cited

U.S. PATENT DOCUMENTS

| | | | | |
|---|---|---|---|---|
| 8,615,221 | B1* | 12/2013 | Cosenza ................. | H04M 3/42 455/414.1 |
| 8,630,208 | B1* | 1/2014 | Kjeldaas ............. | H04L 12/1822 370/260 |
| 2004/0002958 | A1* | 1/2004 | Seshadri ............. | H04L 12/1859 |
| 2004/0246121 | A1* | 12/2004 | Beyda ................. | H04L 12/1827 340/506 |
| 2010/0115033 | A1* | 5/2010 | Geffner ................ | G06Q 10/107 709/206 |
| 2012/0117169 | A1* | 5/2012 | Plotkin ................... | H04L 51/36 709/206 |

(Continued)

*Primary Examiner* — Hee Soo Kim

(57) ABSTRACT

A system and methods are provided for dynamically muting or suppressing notifications of new communications. When a new communication is received for a user of a communication device (e.g., a mobile telephone, a computer) while notifications are muted, no notification may be issued to the user or, alternatively, a muted notification that differs from a normal notification may be issued. A muted notification may have muted sound or no sound, abbreviated vibration or no vibration, or may otherwise be a dampened version of a normal notification. Dynamic muting may be applied or managed on the user's device or on a system that hosts the communication application for which notifications are muted. Different applications and/or communication sessions (e.g., different chat groups) may be muted differently (e.g., for different periods of time). When a group chat session is muted, the duration of muting may be proportional to the number of participants.

17 Claims, 4 Drawing Sheets

(56) References Cited

U.S. PATENT DOCUMENTS

| | | | | |
|---|---|---|---|---|
| 2012/0173635 A1* | 7/2012 | Wormald | ............. | G06Q 10/107 709/206 |
| 2012/0198002 A1* | 8/2012 | Goulart | .................. | H04L 51/36 709/206 |
| 2012/0226806 A1* | 9/2012 | Knight | ................. | G06F 9/4843 709/224 |
| 2012/0258691 A1* | 10/2012 | Baer | .................... | G06F 3/0481 455/412.2 |
| 2013/0097269 A1* | 4/2013 | Plotkin | .................. | H04L 51/02 709/206 |
| 2013/0325951 A1* | 12/2013 | Chakra | .................. | H04L 51/24 709/204 |
| 2013/0332721 A1* | 12/2013 | Chaudhri | ................ | G06F 3/016 713/100 |
| 2014/0237042 A1* | 8/2014 | Ahmed | .................. | H04L 67/02 709/204 |
| 2014/0241517 A1* | 8/2014 | Varoglu | ................. | H04L 51/24 379/201.01 |
| 2014/0380075 A1* | 12/2014 | Pulapaka | ............. | G06F 1/3293 713/323 |

* cited by examiner

DYNAMIC MUTING OF COMMUNICATION NOTIFICATIONS

CROSS-REFERENCE TO RELATED APPLICATION

This application is a continuation of, claims the benefit of, and claims priority to previously filed U.S. patent application Ser. No. 15/269,442 (now U.S. Pat. No. 10,098,090) filed Sep. 19, 2016, which is a divisional of, claims the benefit of, and claims priority to previously filed U.S. patent application Ser. No. 13/782,593 (now U.S. Pat. No. 9,473,428) filed Mar. 1, 2013, entitled "DYNAMIC MUTING OF COMMUNICATION NOTIFICATIONS", which are hereby incorporated by reference in their entirety.

BACKGROUND

This invention relates to the field of communications. More particularly, a system and methods are provided for dynamically muting communication notifications.

Users of devices such as smart phones and some computers are accustomed to receiving various types of communications on their devices, such as electronic mail, instant messages, alarms and/or others. Typically, each time a communication is received, the device issues a corresponding notification. The notification may involve an audible tone, a change in the visual display and/or vibration of the device. The more communications that are received, the more notifications the device issues.

In some situations, such as when a user is engaging in multiple instant messaging sessions or in one session that is very active, her device may issue notifications on a frequent basis. Depending on the manner and frequency of notifications, they may become distracting to the user and/or other people. For example, if the user is engaged in some activity that requires her attention—such as conducting a telephone call, having a conversation or drafting an electronic mail message—her attention may be distracted. Or, if she is attending a meeting or other event with other people, the notifications may become annoying to them.

Communications programs and utilities generally provide little assistance to a user bothered by frequent notifications. At most, they may allow the user to completely shut off notifications. However, the user may then miss an important alert from her spouse, relative or other important person.

In addition, turning notifications off usually requires the user to navigate through a menu of options to find and activate the correct option. Turning notifications back on requires additional navigation and action.

SUMMARY

In some embodiments of the invention, a system and methods are provided for dynamically muting communication notifications made or issued by a user's communication device (e.g., a smart phone, a computer). In these embodiments, when muting is active, no notification may be issued for a newly received communication or only a muted notification may be issued (e.g., with reduced or no volume, with reduced duration or intensity). Muting may be applied only when the corresponding communication application is off-line, or may be applied even when the user is actively engaged with the application.

When muting is not active, a notification will be issued to a user normally in response to receipt of a new communication (e.g., an instant message, an electronic mail message). Muting is then applied to eliminate or mute notifications for some period of time. The muting period may be proportional to a number of participants in a group chat session the user participates in, or proportional to a frequency with which communications have been received, or may be determined in some other manner (e.g., based on a type of communication, based on a preference expressed by the user). Communication notifications for different applications or different communication sessions (e.g., different chat groups) may have different muting periods.

In some embodiments of the invention, a system that hosts the server portion of a communication application installed and operated on a user's device may execute logic for implementing dynamic muting. In these embodiments, when the device is off-line (e.g., not connected to the system), notification of receipt of a new communication must be passed from the system through a telephone service provider, device provider or other third-party facilitator. Therefore, when the system receives a new communication, it determines whether muting is active for the corresponding application or session and, if active, may initiate a message to the corresponding user's device (via the appropriate facilitator) to issue a muted notification, or may not initiate any message to the device.

In other embodiments, a user's communication device itself executes logic for implementing dynamic muting. Such logic may be part of or separate from the communication application associated with the communications that are muted. A system that hosts the server portion of the application can issue to a device a notification regarding a new communication, and the device determines whether, and how, to mute it.

DETAILED DESCRIPTION

Figure 1:
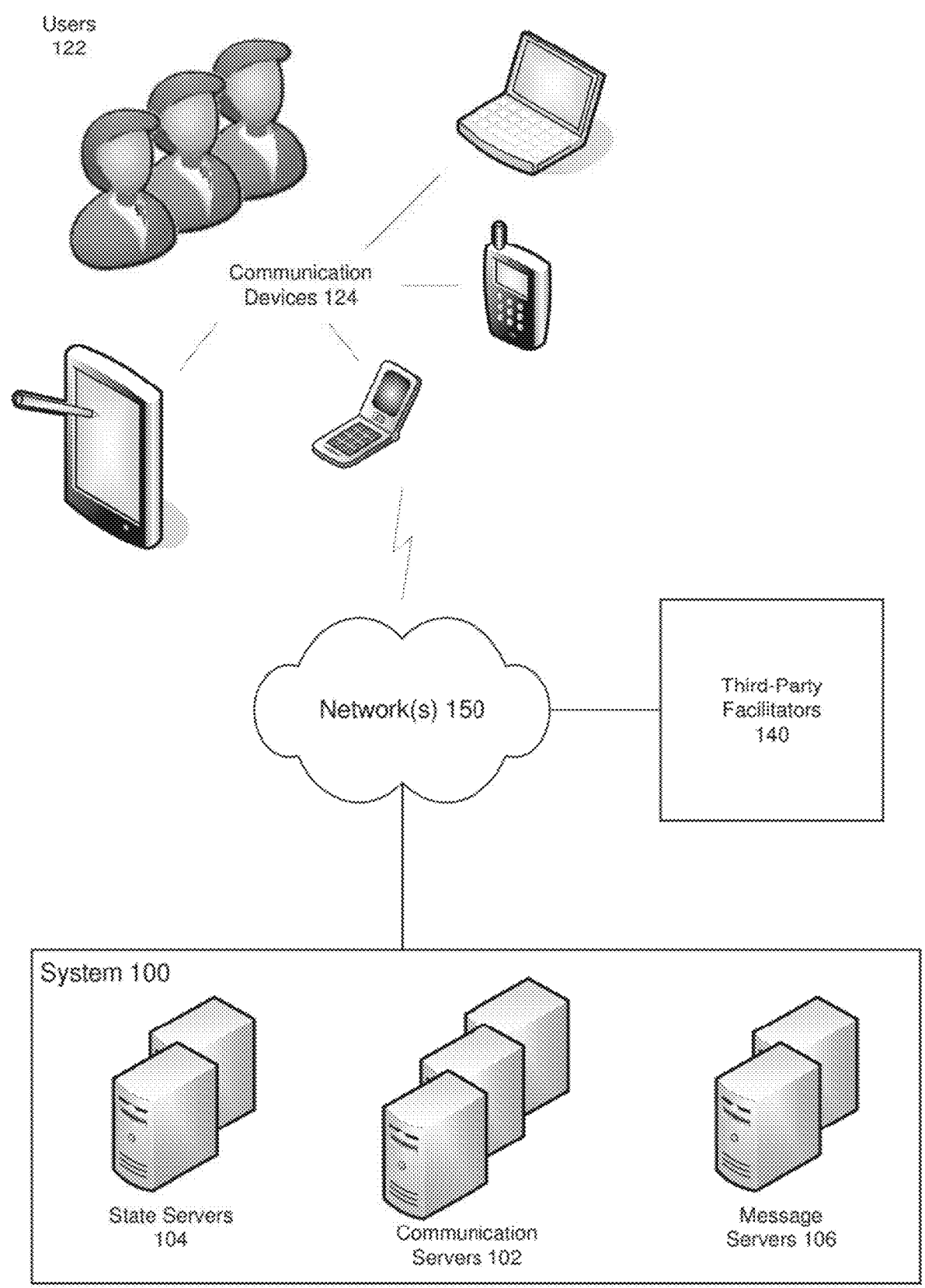
FIG. 1 is a block diagram depicting a communication environment in which some embodiments of the invention may be implemented.

The following description is presented to enable any person skilled in the art to make and use the invention. Various modifications to the disclosed embodiments will be readily apparent to those skilled in the art, and the general principles defined herein may be applied to other embodiments and applications without departing from the scope of the present invention. Thus, the present invention is not intended to be limited to the embodiments shown.

In some embodiments of the invention, a system and methods are provided for automatically and dynamically muting, suppressing or tolling notifications issued to a user of a communication device. The device may be a smart phone, a tablet computer, a notebook or other computer, or some other device having a processor and capable of supporting communications between a user of the device and a user of another device. Notifications that are muted may be associated with an application that involves instant messaging, electronic mail, sharing of media and/or other content, and/or other forms of communication.

Depending on the configuration of the application and/or the user's device, a normal notification may involve an alert that is audible, visible and/or physical. For example, the user's device may normally sound a tone, a melody, a snippet of a song, or some other sound. The device may also, or instead, display a portion of a communication that instigated the notification, display a photo or picture, or show some other notable video content. The device may also, or instead, vibrate or generate some other physical movement/sensation.

In these embodiments of the invention, when a method of muting notifications is active, after one notification is issued, additional notifications are muted or suppressed for some period of time. After expiration of that time period, normal notifications may again be issued. Muting may be applied separately for different applications and/or for different communication sessions within one application (e.g., different chat groups), or notifications from multiple sessions and/or applications may be muted in unison. For example, notifications of instant messages received within one or more group chat sessions may be dynamically muted, but notifications of messages received in a one-on-one chat session may continue.

The duration of time for which notifications are muted may be a function of a frequency with which notifications have been, or normally would be, issued. Thus, if a given communication session is particularly active, and if a notification would normally be issued each time a communication is received at a user's device, a default period of muting may be longer than it would for a communication session that is less active.

In an implementation in which an application or session for which notifications are muted involves group chatting (i.e., multiple participants in an instant messaging session), the default duration of muting may be proportional to the number of participants. As the number of participants in the chat session increases, it may be expected that the frequency of messages delivered to a given participant will increase, thereby justifying a longer period of muted notifications.

In some embodiments, dynamic muting is implemented completely, or almost completely, within a user's communication device. In these embodiments, an application associated with the communications that are muted may include logic to manage the muting, or the device may execute separate logic for implementing the dynamic mute feature. In other embodiments, dynamic muting may be primarily implemented off of a user's device, such as at a system (e.g., a data center) that hosts or facilitates the application for which communications will be muted.

FIG. 1 is a diagram of a communication environment in which some embodiments of the invention may be implemented. In these embodiments, users 122 operate any of a variety of communication devices 124. Devices 124 may include smart phones running virtually any operating system (e.g., Android, BlackBerry, iOS, Nokia S40, Symbian, Windows Phone), tablet computers, other mobile computers, workstations, etc.

System 100 is a data center, computer network or other amalgamation of computer resources for hosting a communication application (or a server portion of a communication application) used by multiple users (e.g., users 122). In some implementations, the application provides a user with instant messaging of text, audio, photos, video and multimedia from his or her communication device (e.g., a device 124).

The application is compatible with various devices 124 and is executed under their native operating systems. A user operating one type of device and subscribing to one communication server provider can exchange messages with users operating other types of devices and subscribing to other communication service providers. Individual messages may be sent to any number of recipients, and a group form of communication (e.g., chat) is offered in which multiple users interactively exchange instant messages. As described below, the dynamic muting feature may be primarily employed within group chat sessions, although it may also be implemented for other communication sessions involving instant messages, electronic mail and/or other communications.

Communication servers 102 host users' connections with system 100 and facilitate the exchange of communications between users. Servers 102 may thus be referred to as "chat" servers, in that they receive messages from individual users for delivery to one or more other users. Illustratively, as long as a user is on-line with system 100 and the application is executing (e.g., in the foreground of the device), a connection or session may be maintained with a chat server.

State servers 104 maintain states or statuses of users and/or users' devices. Thus, a state server stores some or all of a user's profile, including applicable preferences (e.g., preferred audible and/or visual alert), device type/model, etc. State servers 104 also identify a user's telephone service provider, and store information necessary for pushing communications to a user's device where necessary, such as a device token needed to communicate with the device via the applicable third-party. This device token may also or alternatively be known as a "device URI (Uniform Resource Identifier)," a "registration id," a "pin" or may have some other moniker.

In embodiments of the invention in which system 100 manages the dynamic muting of communication notifications (i.e., instead of a device managing its own notifications), state servers may track the commencement of a muting period and determine when to resume normal notifications.

Message servers 106 store communications that cannot be immediately delivered to their destination users. Illustratively, a new message received for a user who is currently on-line with system 100 can be immediately delivered (i.e., through the user's open connection with a communication server 102). A message received for a user who is currently off-line (e.g., does not have an open connection with a communication server 102) may be stored on a message server 106 until it can be delivered.

Any number (e.g., one or more) of communication servers, state servers and message servers may be deployed. The functions of servers 102, 104, 106 may be distributed differently in other embodiments, such as by being merged into fewer servers or divided among additional servers.

The servers of system 100 may be separate physical computers comprising hardware resources (e.g., processor, storage, communication interface) and software resources (e.g., program code, data) suitable for performing the functions ascribed to them. In one alternative, servers 102, 104 and/or 106 may be virtual computing machines that share hardware and/or software resources. Thus, multiple software server modules performing different functions may reside on one computer.

Other components of system 100 are omitted from FIG. 1 for the sake of clarity. For example, the system may include other entities for registering new users, storing users' contacts (e.g., address books), synchronizing a user's contacts among multiple devices and/or with other users, converting content (e.g., a video, a photograph) from one form or format to another, monitoring communications for undesirable content (e.g., spam, malware, pornography), and so on.

Third-party facilitators 140 include communication service providers, manufacturers and/or device providers that relay wake-up messages from system 100 to individual communication devices. Whereas some devices can be woken directly by system 100 when the device is quiescent or the application hosted by system 100 and operated on the device is off-line, others cannot. For the latter type of devices, and as described below, system 100 issues a message to a third-party facilitator that can send a message to the device to cause it to wake up.

Network(s) 150 comprise communication paths between devices 124, system 100 and third-party facilitators 140, and may include data and/or voice communication channels. For carrying data communications, networks 150 may comprise the Internet, one or more intranets, LANs (Local Area Networks), WANs (Wide Area Networks) and/or other point-to-point or distributed connections, which may be wired and/or wireless in nature. For carrying voice communications, networks 150 may comprise wired and/or wireless voice communication links managed by different telecommunication service providers and implementing virtually any wireless technology, such as Global System for Mobile Communications (GSM), Enhanced Data Rates for GSM Evolution (EDGE), Long-Term Evolution (LTE), Code Division Multiple Access (CDMA), Evolution-Data Optimized (EV-DO) and so on.

Networks 150 may thus comprise various entities not shown in FIG. 1, such as routers, gateways, switches, base stations (e.g., wireless access points, Node Bs, Evolved Node Bs) and/or other equipment for establishing, maintaining, switching or otherwise manipulating a data and/or voice connection.

Figure 2:
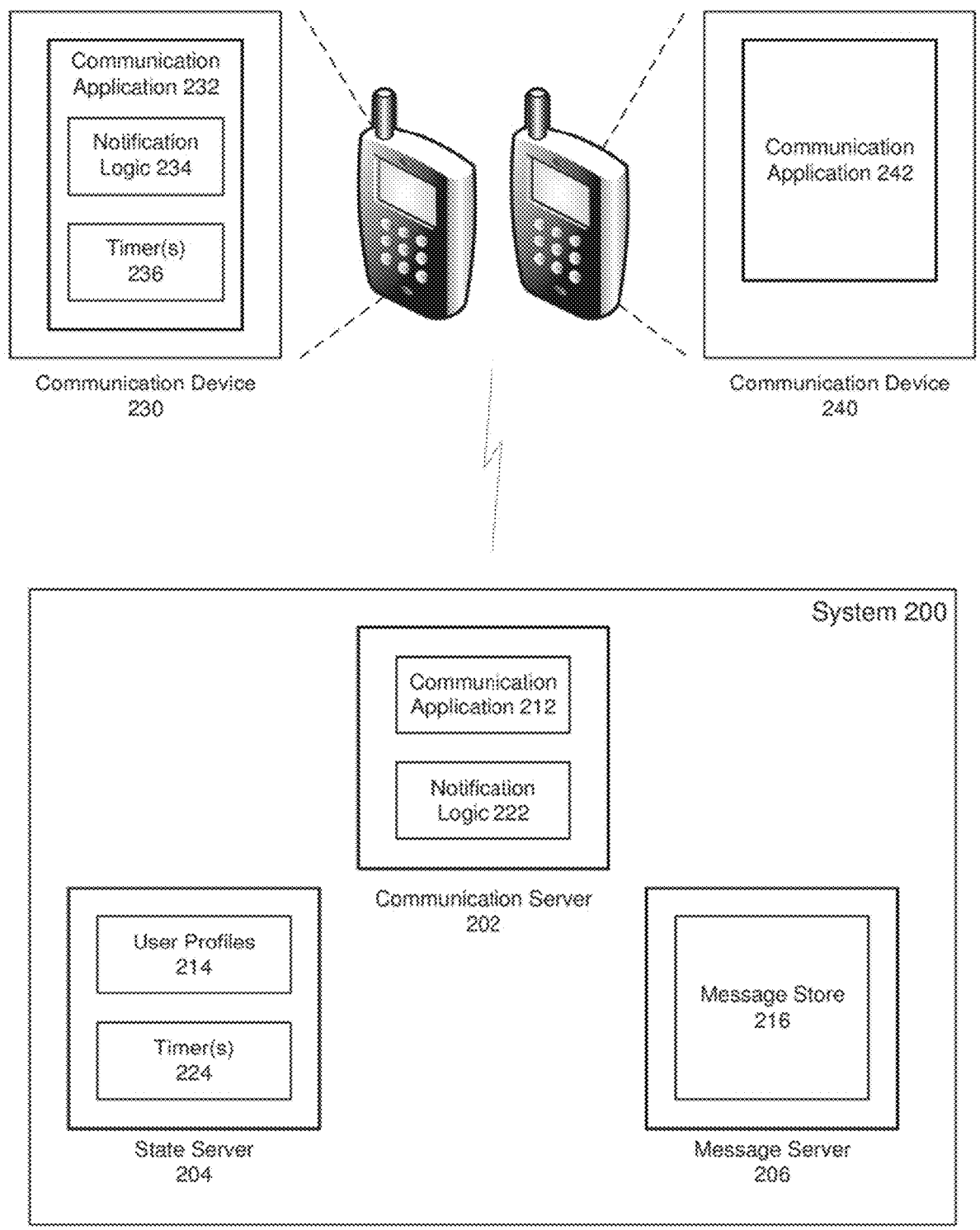
FIG. 2 is a block diagram of a communication device and a system for implementing dynamic muting, in accordance with some embodiments of the invention.

FIG. 2 is a block diagram of communication devices and a system for dynamically muting communication notifications issued to users of the devices, according to some embodiments of the invention.

In these embodiments, system 200 includes one or more of each of communication server 202, state server 204 and message server 206. Communication server 202 includes a server version or portion 212 of a communication application operated by users of compatible devices, and notification logic 222. As described above, application 212 facilitates the exchange of communications and content between users. Logic 222 initiates alerts or notifications to devices (e.g., devices 230, 240) of new communications addressed to users of the devices.

State server 204 includes user profiles 214 and timer(s) 224. In these embodiments of the invention, a user profile 214 stores information that allows system 200 to send a message to a communication device of a user of system 200. Therefore, the profile may include the device's type/model, telephone number, service provider, network address (e.g., IP or Internet Protocol address), a token issued by a manufacturer or provider of a user's device that identifies the device and allows system 200 to send a message to the device, one or more user preferences (e.g., preferred notification tone or sound, preferred notification format) and/or other information.

In some embodiments of the invention in which system 200 comprises multiple state servers, they share some data, but not all. In these embodiments, data indicating how to contact a user (or a user's device) is replicated across all state servers, thereby allowing any of them to answer a query (e.g., from a communication server) regarding how to communicate with a given device. The replicated data thus includes the user's device type/model, service provider, device token, network address and/or other information the system may need in order to contact a device (e.g., to wake it up) directly or through a third-party facilitator.

Data that is retained on individual state servers, and not replicated among them, may include information for managing individual users' dynamic muting, particularly for those users whose devices cannot manage the muting. For each such user for which dynamic muting is active, one of the state servers will store timer(s) 224 identifying each communication application/session that is being muted and a timestamp identifying when muting was turned on (e.g., the time at which the last communication notification was made).

Multiple applications and/or sessions may be muted at one time (e.g., multiple group chat sessions, electronic mail threads with multiple other users), with separate timers, and so multiple sets of these data may be retained for one user. For each such application/session, the associated timestamp will be compared with a timestamp of a new communication, and the difference used to determine whether to continue or to end the muting.

Thus, if a first group chat session that a user is engaged in is to be muted for two minutes, every communication received within two minutes of the corresponding timestamp will be muted (e.g., no notification or a muted notification will be issued to the user by his or her device). Meanwhile, if the muting time period associated with a second group chat session of the user has expired by the time a new message is received, a normal notification will be dispatched.

In some implementations, a user's username, telephone number, network address or other unique identifier is hashed to identify the state server that will store that user's timer(s) 224. Although a user's muting data will not be replicated among all state servers, a subset of all state servers may replicate each user's muting data among themselves. Thus, in different embodiments of the invention, a user's muting data may be stored on just one state server (e.g., and be lost if that server fails), or may be copied among two or more of the state servers for redundancy. Because timers may have maximum durations (e.g., three minutes, ten minutes), and because loss of muting data only results in "normal" notifications being issued, redundancy may be unnecessary.

Message server 206 includes message store 216 for storing messages for off-line users. As the users come on-line and connect to a communication server, the messages are retrieved from storage and delivered to the users.

Because different devices handle notifications differently, servers 202, 204, 206 may store different information and/or operate in different manners for notifications for different users. As introduced above, some communication devices are able to manage dynamic muting on their own; others require some activity be handled by system 200. Therefore, notification logic 222 and timer(s) 224 may be used for the latter type of devices more than for the former.

Further, different devices will be provisioned or configured differently when the communication application is installed. For example, device 230 receives a client version 232 of the application that includes notification logic 234 for notifying a user of a communication, and timer(s) 236 for managing dynamic muting on the device. In contrast, device 240 receives a client version 242 of the application that does not manage its own dynamic muting. In some implementations, the same version of the application may be installed on devices that can and that cannot manage dynamic muting, but some program modules or features will be disabled or unused on devices that cannot manage dynamic muting by themselves.

Figure 3A:
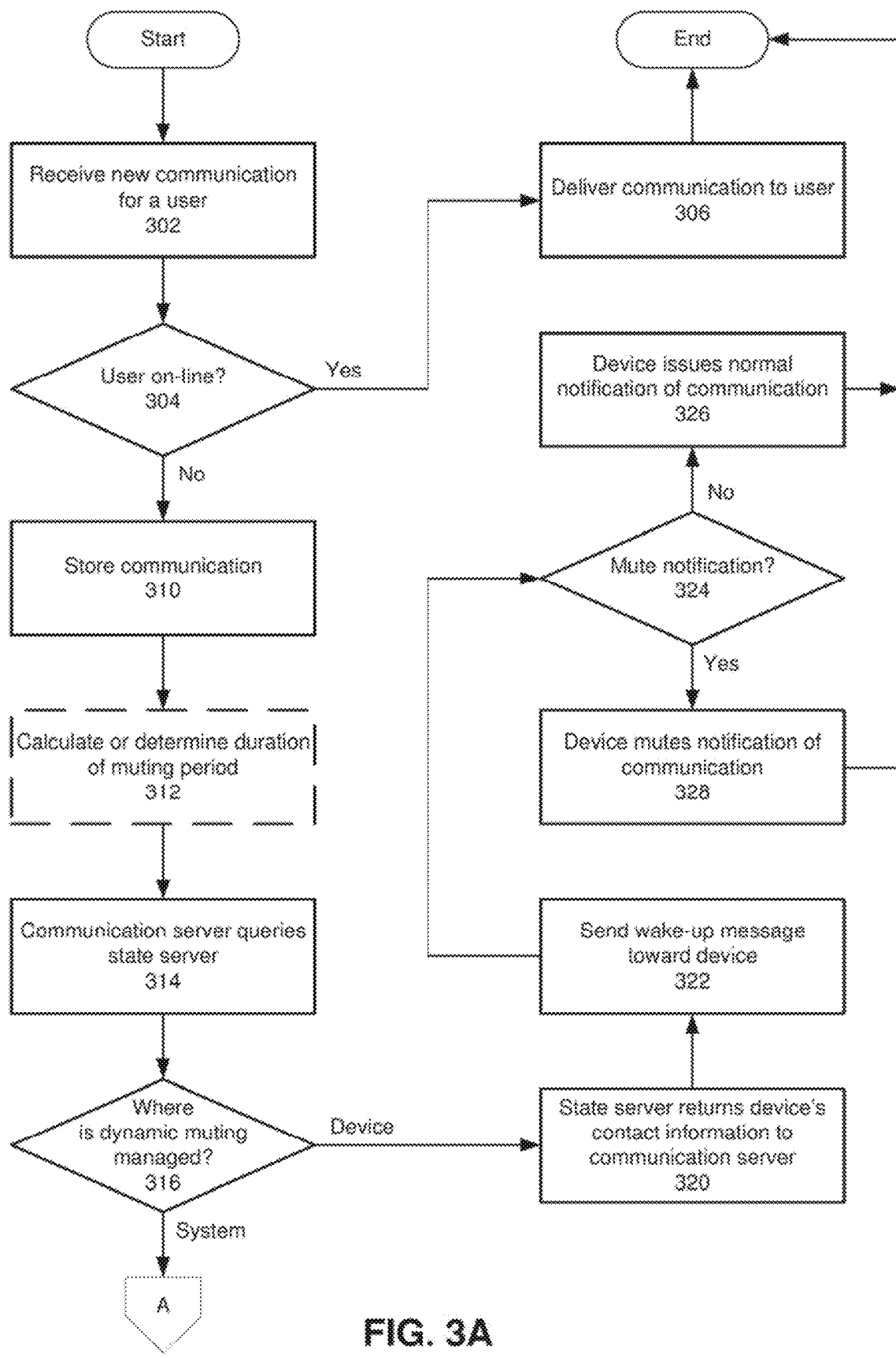
FIGS. 3A-B are a flow chart illustrating a method of dynamic muting, in accordance with some embodiments of the invention.
Figure 3B:
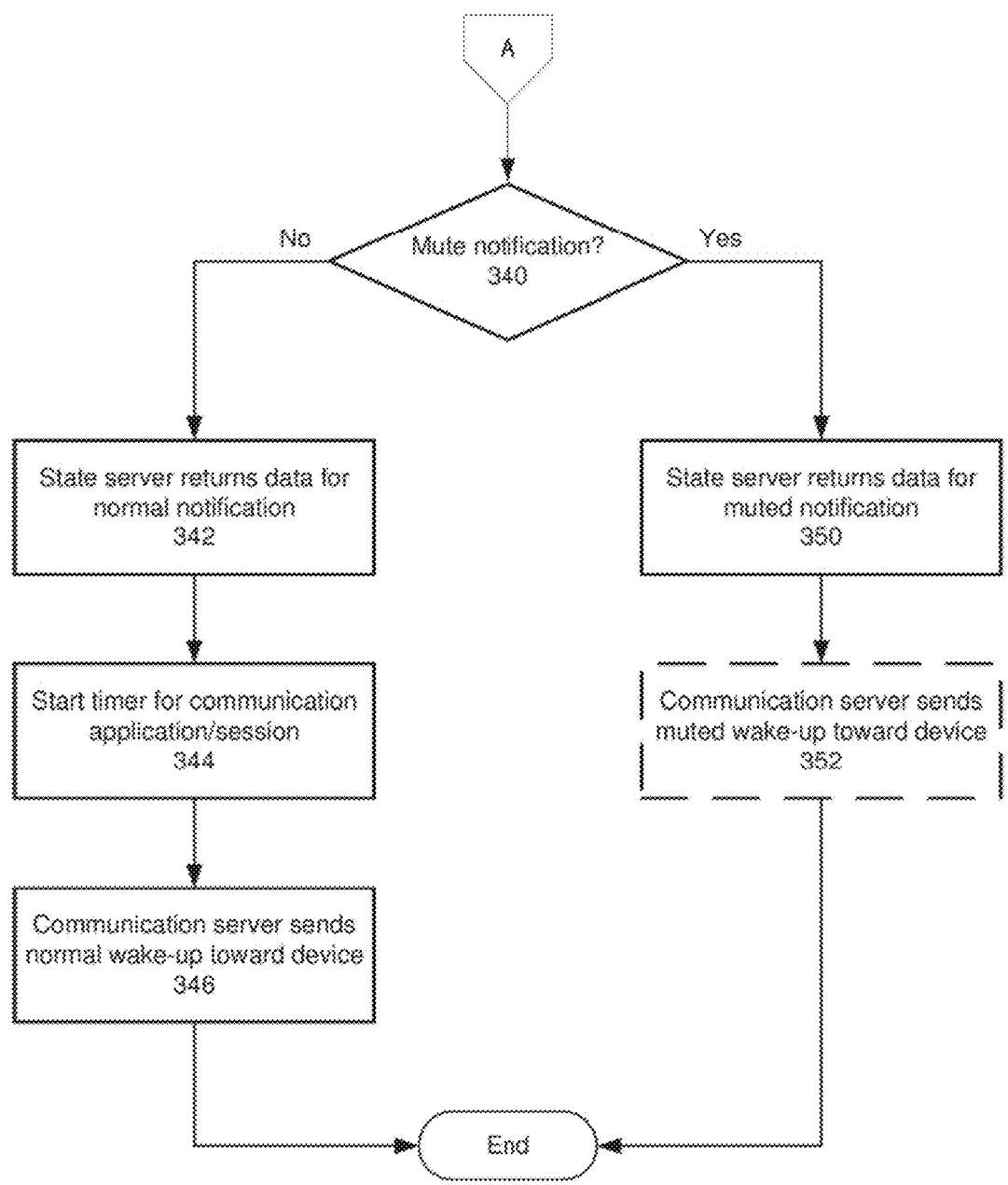

FIGS. 3A-B are a flow chart demonstrating a method of dynamically muting communication notifications, according to some embodiments of the invention. In these embodiments, muting may be implemented at a system hosting the application corresponding to the communications, and/or a user's device that executes the application. Although the illustrated method will be described as it may be employed for a group chat or group instant messaging application, the method may be applied to other applications as well (e.g., electronic mail, conferencing, document sharing).

In operation 302, the system receives a new message for a user. In the group chat application, messages are submitted by group members while they are on-line with the system (e.g., connected to a communication server); other group members or participants may be on-line and/or off-line at the time the new message is received at the system. Although the message may be destined for multiple users (e.g., all members of the group other than the sender), the method will be described as it applies to just one of those users.

In operation 304, the system determines whether the destination user is on-line or off-line. Illustratively, a component of the system described earlier (e.g., communication server 202, state server 204, message server 206), or some other component (e.g., a session server) tracks each user's status as far as whether they are currently on-line or off-line. If on-line, this system component will identify the communication server (or other component) that currently has a connection with the user. Thus, the communication server that receives the new message for the destination user may query the appropriate system component to determine that user's status.

In these embodiments, a user may be considered on-line when her communication device is executing the application and has an open communication connection with a system server. Otherwise, she may be considered off-line with regard to the application. If the destination user is on-line, the method continues at operation 306; otherwise, the method advances to operation 310.

In operation 306, the message is delivered to the destination user via her open connection. This may require passing the message, from the communication server to which the sender is connected, to the communication server to which the recipient is connected (if they are not connected to the same communication server). After operation 306, the illustrated method ends.

In operation 310, the destination user is off-line and so the message is stored on a message server for later retrieval by or delivery to the user.

In optional operation 312, the communication server that received the new message automatically calculates a suitable or required duration of muting for the communication application/session, in case dynamic muting has been or should be applied. For group chat sessions, the default duration of muting may depend on the number of participants, such as five seconds for each participant with a minimum duration of thirty seconds and a maximum of two minutes. For example, if there is a total of 13 members in the group for which the new communication was received, the duration of muting may be 65 seconds. Other values may be implemented in other embodiments.

Thus, the communication server identifies the communication application/session, determines the number of participants (e.g., from memory, from the received message, by querying a state server, session server or other system component) and calculates the duration of muting. The number of participants considered when calculating or determining a muting period may be the total number of group members, or just the number of members that are currently on-line.

In operation 314, the communication server queries a state server to determine how the destination user's device can be contacted (e.g., woken up), whether implementation of dynamic muting is handled on the device or by the system and, if muting is handled by the system, whether it should mute notification of the present communication.

The communication server may query any state server, or a particular state server that would be managing dynamic muting for the destination user's device if, indeed, the system manages such muting. As described above, information needed in order to contact a given user's device may be replicated among most or all state servers, while information for managing dynamic muting for the individual user may be stored on just one server (or a fraction of all servers).

Therefore, the communication server will be able to obtain all the information needed, and assist in the management of the destination user's dynamic muting, by querying a state server that would maintain the user's muting. Alternatively, it may first contact any state server, in order to find out how to contact the user's device and to learn whether dynamic muting is performed on that device or by the system. In the latter case, the communication server may then need to contact a different state server to implement or support dynamic muting.

The method of FIG. 3 is described as it would proceed by contacting the state server that would store the user's dynamic muting information if the system manages muting for the user. One of ordinary skill in the art will understand how the following description may be modified for an alternative scenario.

Thus, to facilitate dynamic muting, in operation 314 the communication server queries the appropriate state server for the necessary contact information, and also identifies the communication application/session (e.g., the group or group chat session for which the message was received) and the muting period calculated in operation 312.

In some implementations, the muting duration and/or other information may only be sent to the state server when needed. Thus, if dynamic muting is managed on the user's communication device, the communication server need not send such information to the state server. Therefore, the system may first determine where muting is applied (i.e., on the device or at the system), and then operate accordingly.

In operation 316, the state server contacted or queried by the communication server determines whether dynamic muting for the destination user is performed on the user's device or at the system. Illustratively, this may be determined based on the device (e.g., type, model, operating system, software configuration) and/or other information, such as the user's service provider or device provider. For example, dynamic muting may be managed at the system for device platforms such as iPhones and Windows® Phones, and may be managed on individual devices for platforms such as Android.

If dynamic muting is managed by the user's device, the method continues at operation 320; if managed by the system, the method advances to operation 340.

In operation 320, the state server responds to the communication server's query by identifying or providing the destination user's device (e.g., type, model, operating system), service provider, device token and/or anything else needed to send a wake-up message to the device. The state server may send some or all of the content of the wake-up message, provide a network (e.g., IP) address or other identifier of a system component (e.g., a communication server, a message server) the device should or could connect to in order to receive the message, and/or other information.

In operation 322, the communication server issues a wake-up message to the device, using information received from the state server. In particular, the message identifies the application (e.g., application 232 of device 230 of FIG. 2), and session (e.g., chat session or chat group) if necessary, and provides the address or other identifier of a system component to connect to. Illustratively, the wake-up message is received and processed by the device's operating system, which opens the application and delivers the message.

In operation 324, the application determines whether to mute a notification to the user, which may be done in different ways in different implementations and for different device platforms.

For example, if the application can initiate a timer that will continue to run even when the application is closed or off-line, it may determine whether any timer that it had started previously has expired. If there is no timer running, or if any such timer has expired for the application or communication session, then a notification will be issued and a new timer activated. If the timer for the corresponding communication application or session has not expired, the notification will be muted, or suppressed.

Different timers may be activated for different chat sessions and/or for different communication applications. Thus, if a user is active in multiple group chat sessions, for example, separate mute periods may be applied for each. Alternatively, of course, some or all sessions may be aggregated and muted in unison.

As another example of how to determine whether to issue a notification, the application may note the time at which each notification is issued to the user, which will mark the beginning of a new period of dynamic muting. When a later communication is received (or a message informing the application of a new communication), the application notes the current time, calculates the amount of time that has passed since the last notification was issued to the user, and compares that difference to the muting period. If the muting period has not yet expired, the notification will be suppressed or muted; otherwise, a normal notification will be issued.

If normal (i.e., non-muted) notification of the communication is to be issued, the method continues at operation 326; otherwise, the method advances to operation 328.

In operation 326, the application issues a normal notification, which may involve changing the visual display (e.g., to indicate a new communication has been received, to identify the sender, to request permission to retrieve the communication or to indicate the message is being retrieved), making an audible sound (e.g., a song snippet, a melody) and/or vibrating or initiating some other physical action. Also, the application may start a timer for the application/session or notes the time of the notification, so as to begin a new muting period. After 326, the method ends and further action depends on how the user reacts to the notification. He or she may ignore the notification, proceed with retrieval of the communication, etc.

In operation 328, notification of the message is muted. Illustratively, muting may involve refraining from issuing any alert to the user regarding the communication. Alternatively, just a visual notification may be made (e.g., without any sound or vibration). As another alternative, an abbreviated notification may be issued (e.g., a single short tone, a momentary vibration). After operation 328, the method ends.

In operation 340 (shown in FIG. 3B), the system is responsible for managing dynamic muting for the destination user. Using the muting period calculated in operation 312, the state server determines whether notification of the communication should or should not be muted. In these embodiments of the invention, instead of activating myriad separate timers for different users and different applications or chat sessions, the state server that stores information for a given user will note (for each application or chat session) the time at which a muting period commences.

Therefore, in operation 340, the state server calculates the amount of time that has elapsed since the timer commenced, and compares that with the muting period received from the communication server. If the elapsed period of time is greater than or equal to the muting period, or if no commencement time is recorded, then notification should proceed normally. If, however, the elapsed period of time is less than the muting period, notification will be muted or suppressed. If the notification should proceed normally, the method continues at operation 342; otherwise, the method continues at operation 350.

In operation 342, the state server returns to the communication server data needed by the communication server to send a normal wake-up message to the user's communication device to inform it of the new communication. The state server may identify the device by type, model, operating system and/or other attributes, and provide information for getting the notification delivered, such as the user's service provider and a device token required by the service provider. The state server may also provide some or all of the content of the wake-up message, a network (e.g., IP) address or other identifier of a system component (e.g., a communication server, a message server) the device should or could connect to in order to receive the message, the user's preferences regarding notifications for this application or session (e.g., preferred sound, preferred duration) etc.

In these embodiments, for off-line devices that cannot manage dynamic muting, wake-up messages to the devices must be routed through the user's telephone service provider or other third-party facilitator. The state server provides the communication server with the data needed to contact the facilitator and to format a message to be delivered to the device by the facilitator. The message may include a snippet of the communication, one or more communication attributes (e.g., sender, time, topic, chat session), the user's preferred notification attribute(s) (e.g., preferred sound, action) and/or other information.

In operation 344, the state server notes the time and records it along with an identification of the communication application and/or session for which the notification is being issued. This commences a new period of dynamic muting for the user.

In operation 346, using information provided by the state server, the communication server transmits a wake-up message for the appropriate third-party facilitator to relay to the user's device.

After operation 346, the notification should be relayed by the facilitator and received at the device. Depending on the type/model of device, operating system and/or other criteria, the notification may simply alert the user to the communication, may offer the user the option of opening the application, may allow the user to ignore the notification, etc. The illustrated method ends, and further action depends on the user's response to the notification.

In operation 350, notification of the communication is to be muted, or suppressed, and so the state server returns a set of information different from that described regarding operation 342. For example, the state server may indicate to the communication server that no notification should be made, in which case nothing is sent to the user's device.

As one alternative, the state server may return information similar to that described for operation 342, but with different attributes for the notification. For example, the state server may indicate that no audio alert (e.g., a null sound, silence) or an abbreviated audio alert (e.g., a short tone, a melody at reduced volume) is to be played, that no vibration (or damped vibration) is to occur, etc.

In optional operation 352, a muted wake-up message is delivered to the user's device via the appropriate third-party facilitator. This operation is optional because, in some implementations, muting of notifications means that no notification is delivered to the device. However, in other implementations, a less intrusive notification may be sent. After operation 352, the method ends.

In other embodiments of the invention, the operations of the method of FIG. 3 may be performed in some other order, and may be combined or further subdivided. In these other embodiments, dynamic muting is still managed within some communication devices and on the system for other devices, and the method may proceed differently depending on where the muting is managed.

In some embodiments of the invention, state servers' state data are constantly or regularly pruned. For example, each muting period commenced for a user may be recorded as a dataset combining a start time and an identifier of the communication application/session for which notifications are being dynamically muted. After expiration of the maximum amount of time that a muting period may persist (e.g., three minutes, five minutes), any datasets having timestamps older than the maximum may be deleted.

In some implementations, when a communication device connects to the system to retrieve a message, and therefore comes back on-line with regard to the application and the system, the state server storing timer data for the corresponding user may be advised of the connection and may remove any datasets it is maintaining for the application.

The environment in which some embodiments of the invention are executed may incorporate a general-purpose computer or a special-purpose device such as a hand-held computer or communication device. Details of such devices (e.g., processor, memory, data storage, display) may be omitted for the sake of clarity.

Data structures and code described in this detailed description are typically stored on a non-transitory computer-readable storage medium, which may be any device or medium that can store code and/or data for use by a computer system. Non-transitory computer-readable storage media includes, but is not limited to, volatile memory, non-volatile memory, magnetic and optical storage devices such as disk drives, magnetic tape, CDs (compact discs), DVDs (digital versatile discs or digital video discs), or other non-transitory computer-readable media now known or later developed.

The methods and processes described in the detailed description can be embodied as code and/or data, which can be stored in a non-transitory computer-readable storage medium as described above. When a processor or computer system reads and executes the code and/or data stored on the medium, the processor or computer system performs the methods and processes embodied as data structures and code and stored within the medium.

Furthermore, the methods and processes described below can be included in hardware modules. For example, the hardware modules may include, but are not limited to, application-specific integrated circuit (ASIC) chips, field-programmable gate arrays (FPGAs) and other programmable-logic devices now known or later developed. When the hardware modules are activated, the hardware modules perform the methods and processes included within the hardware modules.

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art. The scope of the invention is defined by the appended claims, not the preceding disclosure.

What is claimed is:

1. A method of muting communication notifications to a user of a communication device, the method comprising:
    initiating muting of notifications to a user regarding a first chat session, wherein initiating the muting of notifications is performed automatically by the communication device in response to notifying the user of a previous electronic communication in the first chat session;
    receiving an electronic communication as part of the first chat session, the electronic communication identifying a number of participants of the first chat session;
    storing the electronic communication;
    determining a muting period for the first chat session;
    determining whether the muting period has expired; and
    if muting of the first chat session has not expired, refraining from issuing a notification of the electronic communication to the user.

2. The method of claim 1, wherein the muting of notifications regarding the first chat session is managed on a system hosting a communication application associated with the first chat session; and
    said notifying the user, said initiating muting, said determining a muting period, said determining whether the muting period has expired, and said muting notification of the second electronic communication are performed by the system.

3. The method of claim 2, further comprising:
    determining that the device is offline; and
    storing the second electronic communication on a messaging server of the system for future delivery to the device.

4. The method of claim 1, wherein the muting of notifications regarding the first chat session is managed on the device; and
    said notifying the user, said initiating muting, said determining a muting period, said determining whether the muting period has expired, and said muting notification of the second electronic communication are performed by a client communication application executing on the device.

5. The method of claim 4, further comprising receiving a wake-up notification at the device from a communication server in response to the communication server receiving the message.

6. The method of claim 1, wherein the muting period is proportional to the number of participants identified in the second electronic communication.

7. A non-transitory computer-readable medium storing instructions that, when executed by a processor, cause the processor to perform a method of muting communication notifications to a user of a communication device, the method comprising:
- initiating muting of notifications to a user regarding a first chat session wherein initiating the muting of notifications is performed automatically by the communication device in response to notifying the user of a previous electronic communication in the first chat session;
- receiving an electronic communication as part of the first chat session, the electronic communication identifying a number of participants of the first chat session;
- storing the electronic communication;
- determining a muting period for the first chat session;
- determining whether the muting period has expired; and
- if muting of the first chat session has not expired, refraining from issuing a notification of the electronic communication to the user.

8. The medium of claim 7, wherein the muting of notifications regarding the first chat session is managed on a system hosting a communication application associated with the first chat session; and
- said notifying the user, said initiating muting, said determining a muting period, said determining whether the muting period has expired, and said muting notification of the second electronic communication are performed by the system.

9. The medium of claim 8, further comprising:
- determining that the device is offline; and
- storing the second electronic communication on a messaging server of the system for future delivery to the device.

10. The medium of claim 7, wherein the muting of notifications regarding the first chat session is managed on the device; and
- said notifying the user, said initiating muting, said determining a muting period, said determining whether the muting period has expired, and said muting notification of the second electronic communication are performed by a client communication application executing on the device.

11. The medium of claim 10, further comprising receiving a wake-up notification at the device from a communication server in response to the communication server receiving the message.

12. The medium of claim 7, wherein the muting period is proportional to the number of participants identified in the second electronic communication.

13. A system for dynamically muting notifications to a user of a communication application, the system comprising:
- a non-transitory computer-readable medium storing information for maintaining communication connections with users of the communication application;
- a hardware processor circuit;
- a network interface configured to receive a communication for a user as part of a first chat session, the communication identifying a number of participants of the first chat session; and
- muting logic executable on the processor circuit and configured to initiate muting of notifications to the user regarding the first chat session, wherein initiating the muting of notifications is performed automatically by the system running the communication application in response to notifying the user of a previous electronic communication in the first chat session; wherein
- the muting logic is further configured to determine a muting period for the first chat session, determine whether the muting period has expired, and, if muting of the first chat session has not expired, refraining from issuing a notification of the communication to the user.

14. The system of claim 13, wherein the system is a first system and the muting of notifications regarding the first chat session is managed on a second system hosting a communication application associated with the first chat session; and
- said notifying the user, said initiating muting, said determining a muting period, said determining whether the muting period has expired, and said muting notification of the second electronic communication are performed by the second system.

15. The system of claim 14, further comprising:
- determining that the first system is offline; and
- storing the second electronic communication on a messaging server of the second system for future delivery to the device.

16. The system of claim 13, wherein the muting of notifications regarding the first chat session is managed on the system; and
- said notifying the user, said initiating muting, said determining a muting period, said determining whether the muting period has expired, and said muting notification of the second electronic communication are performed by a client communication application executing on the system.

17. The system of claim 16, wherein the network interface is further configured to receive a wake-up notification at the device from a communication server in response to the communication server receiving the message.

* * * * *